(12) United States Patent
Jolly et al.

(10) Patent No.: US 7,703,305 B2
(45) Date of Patent: Apr. 27, 2010

(54) OVERCLADDING AN OPTICAL FIBER PREFORM USING AN AIR-ARGON PLASMA TORCH

(75) Inventors: Jacques Jolly, Chatou (FR); Virginie Herchuelz, Andresy (FR); Rémi Fauche, Acheres (FR); Eric Tutin, Montigny les Cormeilles (FR); Jean-Florent Campion, Conflans St Honorine (FR)

(73) Assignee: Draka Comteq B.V., Amsterdam (NL)

( * ) Notice: Subject to any disclaimer, the term of this patent is extended or adjusted under 35 U.S.C. 154(b) by 797 days.

(21) Appl. No.: 11/397,688

(22) Filed: Apr. 5, 2006

(65) Prior Publication Data
US 2006/0179893 A1 Aug. 17, 2006

Related U.S. Application Data

(62) Division of application No. 10/331,328, filed on Dec. 31, 2002, now abandoned.

(30) Foreign Application Priority Data
Jan. 3, 2002 (FR) ................................ 02 00046

(51) Int. Cl.
*C03B 37/018* (2006.01)
(52) U.S. Cl. ......................................... 65/391; 65/17.4
(58) Field of Classification Search ............ 65/391, 65/17.4, 421
See application file for complete search history.

(56) References Cited

U.S. PATENT DOCUMENTS

| 4,440,558 A | 4/1984 | Nath et al. |
| 4,784,877 A | 11/1988 | Trumble |
| 4,880,452 A | 11/1989 | Kanamori et al. |
| 5,376,767 A | 12/1994 | Heanley et al. |
| 5,522,007 A | 5/1996 | Drouart et al. |
| 6,269,663 B1 | 8/2001 | Drouart et al. |

FOREIGN PATENT DOCUMENTS

FR 2 714 371 A 6/1995

OTHER PUBLICATIONS

Carratt M et al: "MCVD-Plasma Process for Manufacturing Single-Mode Optical Fibers for Terrestiral Applications" Electrical Communication, Alcatel. Brussels, BE, 1994, pp. 11-14 XP000445980.

*Primary Examiner*—John Hoffmann
(74) *Attorney, Agent, or Firm*—Sughrue Mion, PLLC

(57) ABSTRACT

The present invention provides an installation for fabricating or overcladding an optical fiber preform, which installation includes an inductive torch for producing a plasma from a plasma generating gas and material feed means and is characterized in that said plasma generating gas is a mixture of a first gas chosen from diatomic gases and mixtures of at least two gases and argon in a proportion by volume from 0.5% to 10%.

6 Claims, 2 Drawing Sheets

OVERCLADDING AN OPTICAL FIBER PREFORM USING AN AIR-ARGON PLASMA TORCH

Figure 1:
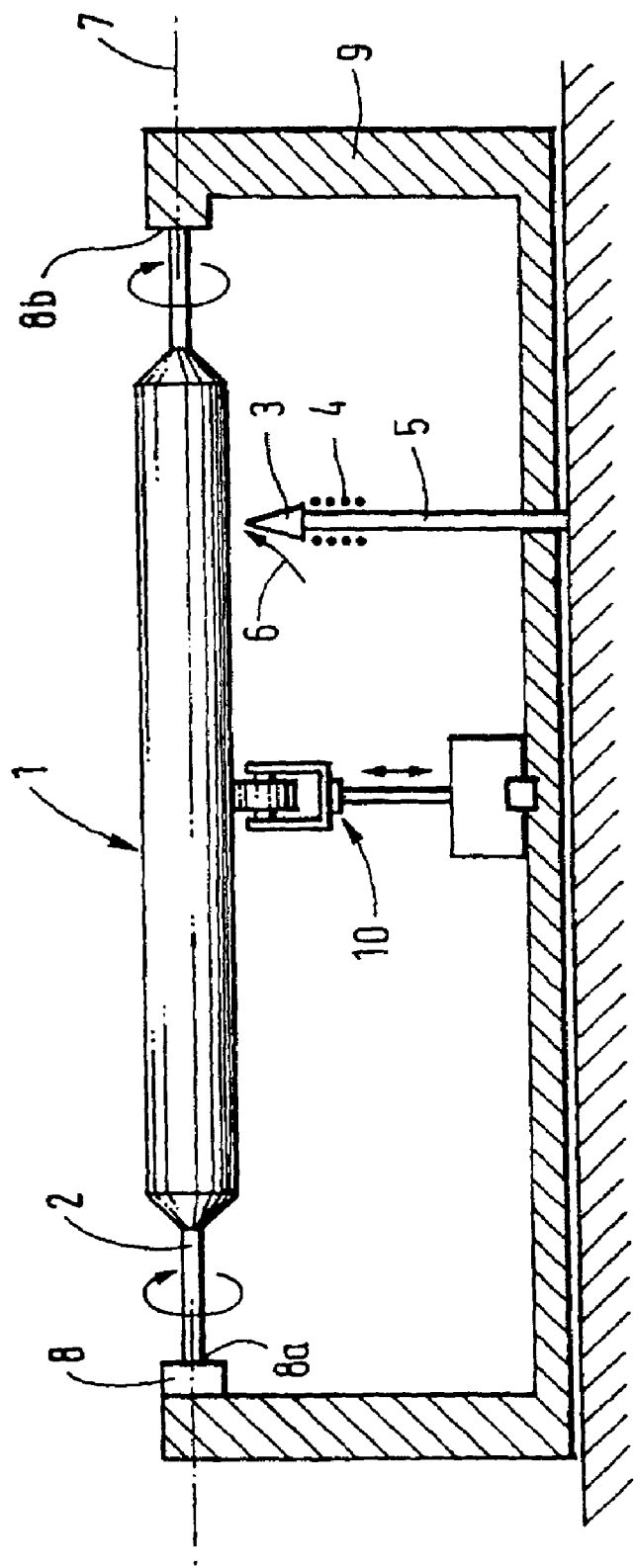

This is a divisional of application Ser. No. 10/331,328 filed Dec. 31, 2002 now abandoned. The entire disclosure of the prior application, application Ser. No. 10/331,328 is hereby incorporated by reference.

The present invention relates to a device for externally depositing silica, possibly doped silica, on a rod in the presence of a plasma created by induction using a high-frequency generator. This is known as plasma overcladding. The invention also relates to a device for implementing the method. The method and the device are used in particular to fabricate preforms intended to be drawn afterward to convert them into optical fibers for telecommunication cables.

Optical fibers are conventionally fabricated from preforms. Obtaining a preform by the plasma overcladding technique is known in the art; it is described in the document EP-0 450 465, for example. A prior art method of fabricating or overcladding preforms intended for the production of optical fibers provides a deposit of silica on a primary preform that is provided with supporting end-pieces at its ends and which is carried by means enabling it to move along its axis and to turn relative to an inductive plasma torch flame into which grains of natural or synthetic silica are injected and in which the grains melt. This method produces a preform of particular diameter from a primary preform of smaller diameter by superposing a succession of concentric silica layers.

The document FR-2 253 723 describes equipment for preparing a preform for producing an optical waveguide. Starting with a tube or a rod that is to constitute a core region, a second composition is deposited internally or externally by moving the tube or rod in translation in front of the flame of a plasma torch whose projection chamber is fed with the second composition in the form of an ultrafine powder. The torch receives from a supply a plasma generating gas, which is preferably argon. The fine powder that forms the deposit is conveyed by a carrier gas, which is preferably argon. A plasma torch provides a powder exit speed of at least 100 m/s.

The document EP-0 401 742 describes a method of external deposition on a silica rod in the presence of a plasma created by an induction coil fed by a high-frequency generator. A plasma generating gas such as oxygen, nitrogen or argon is introduced into the torch. The deposition is effected with the aid of an injector nozzle that directs toward the rod a mixture of oxygen and a silicon compound, possibly together with doping substances.

The document EP-0 658 520 describes a method of overcladding an optical fiber preform using a plasma torch in which the plasma generating gas is air, except when priming the torch, when argon is substituted for air. Grains of natural or synthetic silica are injected into the flame of the torch and the molten silica is sprayed onto the primary preform moving in translation in front of the flame.

The document U.S. Pat. No. 5,861,047 describes a method using an isothermal plasma torch. Oxygen or a plasma containing oxygen in the form of an oxygen/argon mixture is used, for example.

The document EP-0 982 272 describes a method of surface treating an optical fiber preform with a plasma jet generated by an RF coil energized by an RF generator. It is known in the art that a wide variety of gases can be used in an isothermal plasma torch, for example gases containing at least oxygen, argon, nitrogen or helium, with the possibility of adding another gas thereto. The power of the plasma torch (i.e. of the RF generator) varies from 10 kW to 100 kW, depending on the frequency, and in particular from 20 kW to 60 kW at around 3 MHz.

With the aim of making the overcladding process more productive, attempts have been made to increase the overcladding speed and the diameter of the preforms treated in this way. Increasing the speed of the overcladding method corresponds to increasing the quantity of molten material per unit time, the problem being to melt large quantities of grains successfully. Increasing the diameter of the preform increases the thermal inertia and the surface area to be heated.

The gas employed to generate the plasma contributes to improving thermal efficiency. In the prior art, a diatomic gas, such as oxygen or nitrogen, is preferably used or mixtures of diatomic gases, such as air, are advantageously used, since a diatomic gas intrinsically has a higher thermal power than monoatomic gases, thanks to the dissociation energy of the gas molecules:

Diatomic gas: e.g. oxygen
  dissociation:

$O=2\ O°$ with the associated quantity of energy $\Delta G_{dissociation}=494$ kJ/mol
  Ionization:

$O°=O^-+e$ with the associated quantity of energy $\Delta G_{ionization}=1308$ kJ/mol Monoatomic gas: e.g. argon
  Ionization:

$Ar=Ar^-+e$ with the associated quantity of energy $\Delta G_{ionization}=1513$ kJ/mol The energy available in a diatomic gas oxygen, nitrogen, air, etc.) plasma is therefore very much greater than the energy available in argon, for example. Ionizing argon requires much less energy (1513 kJ/mol) than dissociating and ionizing oxygen (494+2*1308=3110 kJ/mol) or nitrogen (962+2*1397=3756 kJ/mol).

In low-power applications using argon plasmas, it is known in the art to add a small proportion of diatomic gas (hydrogen, nitrogen, oxygen, etc.) to increase significantly the thermal properties of the argon plasma, whilst remaining within the power capabilities of the generator and the resistance possibilities of the torch employed.

All of the means currently employed increase the thermal efficiency of the plasma flame, either by increasing the power of the generator that energizes the torch or by increasing the size of the torch (wider flame). The hydrodynamic behavior of the plasma becomes unstable under some conditions. In particular, it is difficult to stabilize the plasma in a large-diameter torch, leading to a tendency for the torch to be extinguished. This is a problem because a large-diameter torch is essential if high electrical powers are to be used, failing which the proximity of the torch and the plasma leads to destruction of the torch.

An object of the present invention is to propose an installation for overcladding a preform, the installation including an inductive plasma torch in which the plasma flame is more stable.

The present invention provides an installation for fabricating or overcladding an optical fiber preform, which installation includes an inductive torch for producing a plasma from a plasma generating gas and material feed means and is characterized in that said plasma generating gas is a mixture of a first gas chosen from diatomic gases and mixtures of at least two gases and argon in a proportion by volume from 0.5% to 10%.

The argon does not improve the thermal properties in the manner previously explained, but improves the electrical properties of the plasma, which are one cause of stability and efficient electromagnetic coupling. This produces a greater concentration of electrons in the gas, which facilitates electromagnetic heating of the whole of the gas mixture, including the plasma generating diatomic gas that contributes to the thermal efficiency of the plasma.

It is therefore possible to envisage torch diameters greater than those used at present, in order to be able to employ generators of higher power. This is a step toward higher deposition speeds, but retains an acceptable quality of fusion of the glass.

The plasma torch according to the invention has a diameter from 60 mm to 200 mm and preferably from 60 mm to 120 mm. Its power is from 20 kW to 200 kW.

Figure 2:
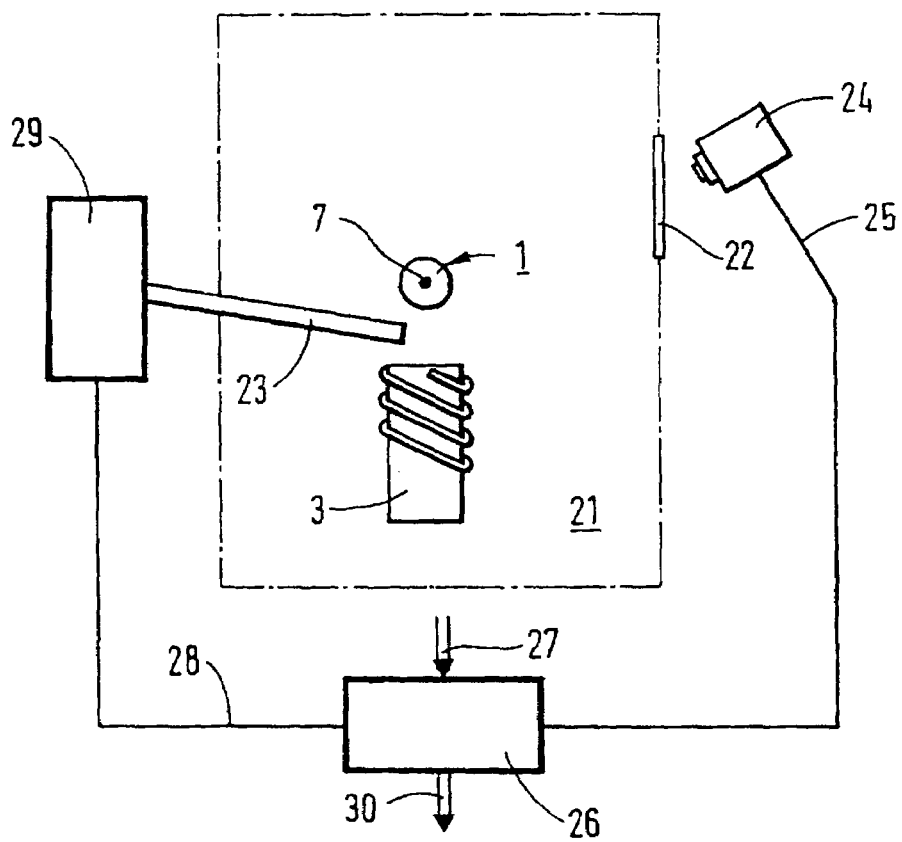
Figure 3:
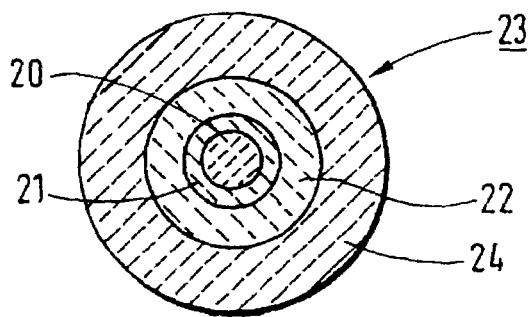

The invention will be better understood and other advantages and features of the invention will become apparent on reading the following description, which is given by way of non-limiting example and refers to the accompanying drawings, in which:

FIG. 1 is a diagrammatic representation of a preform in the process of fabrication using an installation according to the invention, FIG. 2 is a diagrammatic view of the FIG. 1 installation as seen along the longitudinal axis of the preform, and FIG. 3 is a view in section of a preform after overcladding in accordance with the invention.

FIG. 1 shows an installation for the fabrication, and in particular for the overcladding, of a primary preform 1 having a central support core 2. The installation includes heating means employing an induction plasma torch 3 and material feed means positioned radially relative to the preform 1. The material feed means, not shown, associated with the plasma torch 3 are conventionally used to inject grains of silica into the flame of the torch 3, which melts them. The figure shows a plasma torch 3 and the associated induction coil 4, but not the electrical power generator connected to the coil 4. It also shows a pipe 5 opening into the bottom of the torch and feeding a plasma generating gas into the torch. In this example, the plasma generating gas is air (comprising approximately 80% by volume of nitrogen $N_2$ and 20% by volume of oxygen $O_2$) containing 5% by volume of argon. The arrow 6 indicates the injection of grains of natural or synthetic silica into the flame of the torch for overcladding the preform 1. Said plasma torch 3 is preferably such that virtually all of the exterior surface of the preform reaches a temperature greater than 2000° C. during treatment, and even more preferably greater than 2300° C. This corresponds to induction convective heating at a power that is generally from 50 kW to 100 kW and preferably from 70 kW to 100 kW.

A primary preform 1 is overclad to obtain a preform that can be used to produce a fiber by depositing in successive posses a series of superposed concentric layers. As known in the art, the installation allows relative movement in longitudinal translation of the plasma torch 3 and the material feed means in a plane transverse to the longitudinal axis 7 of the preform 1, so that virtually all of the exterior of the surface of the preform 1 can be heated at least once during the treatment. Also, the preform 1 is rotated on itself about its longitudinal axis 7. The installation includes means 8 for rotating the horizontal rotation shaft 7 on which the support core 2 of the preform 1 to be overclad is mounted. Moving the torch in translation relative to the preform can be envisaged, but it is more conventional for the preform to be mounted on a lathe which moves the preform, held by its ends, in translation relative to the torch, which in this case is fixed. In the embodiment shown in FIG. 1, the rotation means 8 are on a chassis 9 mobile in translation parallel to the rotation axis 7 and the plasma torch 3 and the material feed means are fixed. The preform 1 being overclad is moved in translation at the some time as the chassis 9, to which it is attached at two bearing points which are the mounting points 8a, 8b of the support core 2 on the rotation means 8. Overcladding the preform entails a plurality of passes of the preform 1 in front of the plasma torch 3 and the material feed means.

This has the advantage that an automated process can treat virtually all of the exterior surface of the preform, with the optimum yield. In a preferred embodiment like this, for a preform with a diameter from 15 mm to 200 mm, the speed of relative longitudinal movement of the heating means and the preform is from 5 mm/min to 100 mm/min, and the preform rotates on itself about its longitudinal axis at a rotation speed from 5 rpm to 100 rpm.

The installation preferably further includes controlled supporting means 10 disposed between the mounting points 8a, 8b and constituting complementary bearing points for the preform 1. Accordingly, if the location of the controlled supporting means 10 is chosen carefully, the sag due to the mass of the preform 1 during fabrication or overcladding can be reduced.

FIG. 2 is a view in a direction perpendicular to that of FIG. 1 of the plasma overcladding installation in which the invention can be used. The installation comprises an enclosure 21 provided with a transparent window 22 and containing the primary preform 1, which is seen end-on, toward which are directed a plasma torch 3 and means 23 for feeding overcladding grains. Outside the enclosure, a video camera 24 can be placed behind the window 22 and pointed at the preform 1. It supplies a measured value of the diameter of the preform at the location at which it is pointed, in the form of a value transmitted by a link 25 to an overcladding process control device 26. The latter receives other information on the execution conditions of the overcladding process over a multiple link 27. Under the control of an internal overcladding process control program, the device 26 supplies a grain flowrate command value over an output link 28 to a grain flowrate metering unit 29 which feeds the nozzle 23 accordingly. The device 26 also receives other command values determining other aspects of execution of the control process over a multiple output link 30. The plasma overcladding is effected by successive passes, from right to left and then from left to right, during which the plasma torch 3 and the nozzle 23 are swept the length of the preform 1.

These features of an installation for external plasma deposition of silica onto a blank or other object, in particular a primary preform, are known in the art, in particular from EP-0 440 130, and for this reason are shown only in part. They deliver the grains of silica into the flame and spray the molten silica onto the primary preform, which is mounted so that it can rotate and move in translation in front of the flame, the silica deposited laterally on the primary preform vitrifying directly thereon.

The plasma overcladding technique using pure or doped silica enables direct vitrification of the overcladding silica on a primary preform. It also has the advantage that it can be applied to a preform produced by any prior art method, such as the modified chemical vapor deposition (MCVD) process or the furnace chemical vapor deposition (FCVD) variant thereof, using a furnace in place of a torch. In the context of fabricating a primary preform using the MCVD technology, successive layers of silica, possibly doped silica, are deposited on the inside of a silica tube, after which the tube internally coated in this way is collapsed to form a rod constituting the primary preform. The overcladding technique adds to the thickness of the external layer of the primary preform and the plasma overcladding material is as close as possible to that of the external layer of the primary preform. It is also used to produce all of the external cladding of the final preform obtained by overcladding starting from a primary preform. When producing the external cladding, the overcladding material is chosen to have a refractive index that differs appropriately from that of the optical cladding that it covers.

Before the overcladding treatment, the optical fiber primary preform 1 is produced by an MCVD process, carried out by internally depositing layers based on silica, possibly doped silica, forming an optical core 20 and an optical cladding 21 in a tube 22, followed by collapsing the tube internally coated in this way to transform it into a rod which constitutes the primary preform 1. FIG. 3 shows the preform 23 after overcladding in accordance with the invention or the optical fiber obtained from that preform in section. The preform 23 consists of the primary preform 1 and an optical coating formed of at least one layer 24 of pure silica. It is the result of the plasma overcladding carried out in accordance with the invention, leading to the deposition of the layer 24 on the primary preform 1. The core 20 and the optical cladding 21 are of suitably doped silica. They have refractive indices different from each other and from that of the coating consisting of the silica layer 24, as is well known in the art of manufacturing optical fiber preforms.

The invention claimed is:

1. A method for overcladding an optical fiber preform, the method comprising:

providing an inductive torch;

producing a plasma generating gas having a predetermined mixture and supplying said plasma generating gas to the inductive torch, said predetermined mixture is air containing between 5% to 10% by volume of argon; and feeding overcladding material to the inductive torch, wherein the inductive torch causes the plasma generating gas to become a plasma to overclad the preform with the overcladding material.

2. A method according to claim 1, wherein said inductive torch has a diameter, and wherein the diameter of the inductive torch is in a range from 60 mm to 200 mm.

3. A method according to claim 2, wherein said inductive torch has a diameter, and wherein the diameter of the inductive torch is in a range from 60 mm to 120 mm.

4. A method according to claim 1, wherein said inductive torch has a power, and wherein the power of the inductive torch is in a range from 20 kW to 200 kW.

5. A method according to claim 1, wherein the feeding overcladding material to the inductive torch includes injecting grains of silica into the plasma.

6. A method according to claim 1, wherein the optical fiber preform includes a primary perform that is obtained from a chemical vapor deposition process.

* * * * *